United States Patent
Cheon

Patent Number: 6,070,210
Date of Patent: May 30, 2000

[54] TIMING MODE SELECTION APPARATUS FOR HANDLING BOTH BURST MODE DATA AND SINGLE MODE DATA IN A DMA TRANSMISSION SYSTEM

[75] Inventor: Mu-Cheol Cheon, Gumi, Rep. of Korea

[73] Assignee: SamSung Electronics Co., Ltd., Suwon, Rep. of Korea

[21] Appl. No.: 09/005,578

[22] Filed: Jan. 12, 1998

[30] Foreign Application Priority Data

Jan. 10, 1997 [KR] Rep. of Korea .......................... 97-481

[51] Int. Cl.[7] .................................................. G06F 13/32
[52] U.S. Cl. ............................................. 710/105; 710/22
[58] Field of Search ................................ 710/22, 35, 36, 710/105, 25

[56] References Cited

U.S. PATENT DOCUMENTS

| | | | |
|---|---|---|---|
| 4,084,154 | 4/1978 | Panigrahi | 365/222 |
| 4,403,282 | 9/1983 | Holberger et al. | 710/22 |
| 4,530,053 | 7/1985 | Kriz et al. | 710/22 |
| 4,799,199 | 1/1989 | Scales, III et al. | 365/230 |
| 4,999,769 | 3/1991 | Costers et al. | 711/118 |
| 5,175,825 | 12/1992 | Starr | 395/325 |
| 5,287,486 | 2/1994 | Yamasaki et al. | 710/22 |
| 5,347,643 | 9/1994 | Kondo et al. | 711/118 |
| 5,410,656 | 4/1995 | King et al. | 395/325 |
| 5,440,751 | 8/1995 | Santeler et al. | 710/22 |
| 5,453,957 | 9/1995 | Norris et al. | 365/230.04 |
| 5,513,374 | 4/1996 | Baji | 398/846 |
| 5,559,990 | 9/1996 | Cheng et al. | 395/484 |
| 5,590,286 | 12/1996 | Mehring et al. | 395/250 |
| 5,613,162 | 3/1997 | Kabenjian | 395/842 |
| 5,634,099 | 5/1997 | Andrews et al. | 395/200.07 |
| 5,634,139 | 5/1997 | Takita | 395/855 |
| 5,642,386 | 6/1997 | Rocco, Jr. | 375/355 |
| 5,669,014 | 9/1997 | Iyengar et al. | 710/35 |
| 5,696,917 | 12/1997 | Mills et al. | 395/401 |
| 5,701,516 | 12/1997 | Cheng et al. | 395/842 |
| 5,754,764 | 5/1998 | Davis et al. | 1/1 |

*Primary Examiner*—Xuan M. Thai
*Attorney, Agent, or Firm*—Robert E. Bushnell, Esq.

[57] ABSTRACT

A timing mode selection apparatus for use in a DMA transmission system having a DMA device and an input/output device directly accessible to a memory. The timing mode selection apparatus includes a microprocessor for generating a mode selection control signal for switching a timing mode. A first buffer transfers a single mode data acknowledgment signal from the DMA device to the input/output device in response to the mode selection control signal having a first logic state. A second buffer transfers a burst mode data acknowledgment signal from the DMA device to the input/output device in response to the mode selection control signal having a second logic state. An inverter inverts the mode selection control signal output from the microprocessor. The inverted mode selection control signal is applied to a control terminal of the second buffer. In this manner, the mode selecting apparatus may freely switch the DMA transmission system between a burst mode and a single mode.

8 Claims, 2 Drawing Sheets

TIMING MODE SELECTION APPARATUS FOR HANDLING BOTH BURST MODE DATA AND SINGLE MODE DATA IN A DMA TRANSMISSION SYSTEM

CLAIM OF PRIORITY

This application makes reference to, incorporates the same herein, and claims all benefits accruing under 35 U.S.C. §119 from an application for TIMING MODESELECTION APPARATUS FOR USE IN DMA TRANSMISSION SYSTEM earlier filed in the Korean Industrial Property Office on the of Jan. 10, 1997 and there duly assigned Ser. No. 481/1997.

BACKGROUND OF THE INVENTION

1. Technical Field

The present invention generally relates to a direct memory access (DMA) transmission, and more particularly to a timing mode selection apparatus for use in a DMA transmission system.

2. Related Art

In a direct memory access (DMA) transmission system, data is directly transmitted between a main memory and an input/output device without passing through a central processing unit. That is, while the central processing unit executes an input/output command, the data is directly transmitted to an associated device via the input/output device.

As explained in more detail below, it is typical for such a DMA transmission system to operate in the DMA mode, which includes a burst mode and a single mode. However, such a DMA transmission system can operate in only one mode at a time, either the burst mode or the single mode. Therefore, it is necessary at times to transfer between the burst mode and the single mode. However, it is not easy to freely change modes in view of the system conditions existing at the time. Therefore, there is a need for the development of a DMA transmission system having a mode selecting apparatus for handling both the burst mode and the single mode in such a system.

The following patents are considered to be representative of the prior art relative to the present invention, and are burdened by the disadvantage discussed above: U.S. Pat. No. 5,701,516 to Cheng et al., entitled High-Performance Non-Volatile RAM Protected Write Cahce Accelerator System Employing DMA And Data Transferring Scheme, U.S. Pat. No. 5,669,014 to Iyengar et al., entitled System And Method Having Processor With Selectable Burst Or No-Burst Write Back Mode Depending Upon Signal Indicating The System Is configured To Accept Bit Width Larger Than The Bus Width, U.S. Pat. No. 5,696,917 to Mills etal., entitled Method And Apparatus For Performing Burst Read Operations In An Asynchronous Nonvolatile Memory, U.S. Pat. No. 5,642,386 to Rocco Jr., entitled Data Sampling Circuit For A Burst Mode Communication System, U.S. Pat. No. 5,634,139 to Takita, entitled Microprocessor Using Feedback Memory Address To Internally Generate Bust Mode Transfer Period Signal For Controlling Burst Mode Data Transfer To External Memory, U.S. Pat. No. 5,634,099 to Andrews et al., entitled Direct Memory Access Unit For Transferring Data Between Processor Memories In Multiprocessing Systems, U.S. Pat. No. 5,613,162 to Kabenjian, entitled Method And Apparatus For Performing Efficient Direct Memory Access Data Transfers, U.S. Pat. No. 5,590,286 to Mehring et al., entitled Method And Apparatus For The Pipelining OfData During Direct Memory Accesses, U.S. Pat. No. 5,559,990 to Cheng et aL, entitled Memories With Burst Mode Access, U.S. Pat. No. 5,513,374 to Baji, entitled On-Chip Interface And DMA Controller With Interrupt Functions For Digital Signal Processor, U.S. Pat. No. 5,453,957 to Norris et al., entitled Memory Architecture For Burst Mode Access, U.S. Pat. No. 5,410,656 to King et al., entitled Work Station Interfacing Means Having Burst Mode Capability, U.S. Pat. No. 5,347,643 to Kondo et al., entitled Bus System For Coordinating Internal And External Direct Memory Access Controllers, U.S. Pat. No. 5,287,486 to Yamasaki etal., entitled DMA Controller Using A Programmable Timer, A Transfer Counter and An Or Logic Gate To Control Data Transfer Interrupts, U.S. Pat. No. 5,175,825 to Sarr, entitled High Speed, Flexible Source/Destination Data Burst Direct Memory Access Controller, U.S. Pat. No. 4,999,769 to Costers et al., entitled System With Plural Clocks For Bidirectional Information Exchange Between DMA Controller And I/O Devices Via DMA Bus, U.S. Pat. No. 4,799,199 to Scales III et al., entitled Bus Master Having Burst Transfer Mode, U.S. Pat. No. 4,530,053 to Kriz et al., entitled DMA Multimode Transfer Controls, U.S. Pat. No. 4,403,282 to Holberger et al., entitled Data Processing System Using A High Speed Data Channel For Providing Direct Memory Access For Block Data Transfers, and U.S. Pat. No. 4,084,154 to Panigrahi, entitled Charge Coupled Device Memory System With Burst Mode.

SUMMARY OF THE INVENTION

It is, therefore, an object of the present invention to provide a mode selecting apparatus for handling both a burst mode and a single mode in a DMA transmission system.

According to an aspect of the present invention, a timing mode selection apparatus for use in a direct memory access (DMA) transmission system having a DMA device and an input/output device directly accessible to a memory includes: a microprocessor for generating a mode selection control signal for switching a timing mode; a first buffer for transferring a single mode data acknowledgment signal from the DMA device to the input/output device in response to a mode selection control signal having a first logic state; a second buffer for transferring a burst mode data acknowledgment signal from the DMA device to the input/output device in response to a mode selection control signal having a second logic state; and an inverter for inverting the mode selection control signal output from the microprocessor, the inverted mode selection control signal being applied to a control terminal of the second buffer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
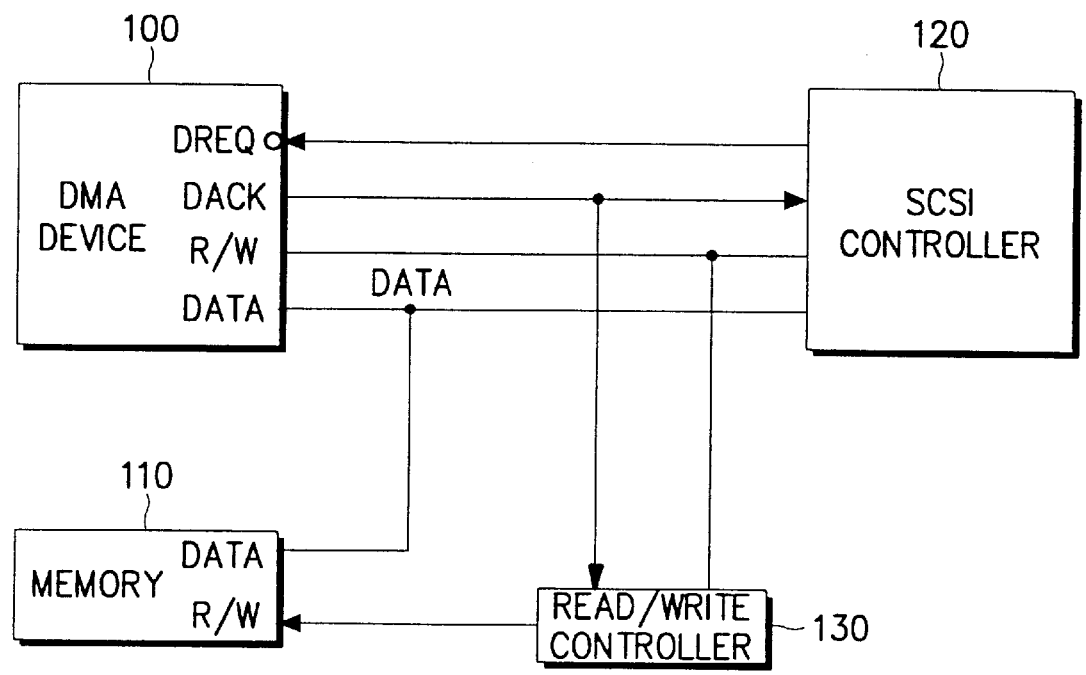
FIG. 1 is a block diagram of a DMA transmission system in general.

A preferred embodiment ofthe present invention will be described in detail hereinbelow with reference to the attached drawings, in which the like reference numerals represent the like elements. Further, it should be clearly understood that many specifics such as the detailed circuit elements are shown only by way of an example to bring a better understanding of the present invention and the present invention may be embodied without the specifics. Moreover, it should be noted that detailed descriptions on the related prior art may be intentionally omitted if it is believed to be unnecessary in describing the concepts of the present invention.

Referring to FIG. 1, a DMA transmission system includes a DMA device 100, a memory 110, an SCSI (Small Computer System Interface) controller 120, and a read/write controller 130. The DMA device 100 controls data transmission between the memory 110 and the SCSI controller (or an AT HDD controller) 120 which is an input/output device. Upon receiving a DMA request signal DREQ generated by the SCSI controller 120, the DMA device 100 sends a data acknowledgment signal DACK to the SCSI controller 120 and the read/write controller 130. Then, the read/write controller 130 sends a DMA mode control signal to the memory 110 in response to the data acknowledgment signal DACK so as to allow the DMA transmission system to operate in a DMA mode. The DMA mode includes a burst mode and a single mode. In the burst mode, data is completely transmitted between the memory 110 and the SCSI controller 120 without any interruption in the course of transmitting a whole data block. In the single mode, the DMA transmission system first processes interrupts if the interrupts are generated in the course of transmitting the data.

However, the DMA transmission system discussed above operates in only the burst mode or the single mode at any given time. Therefore, it is not easy to freely change the timing modes according to the system conditions.

Figure 2:
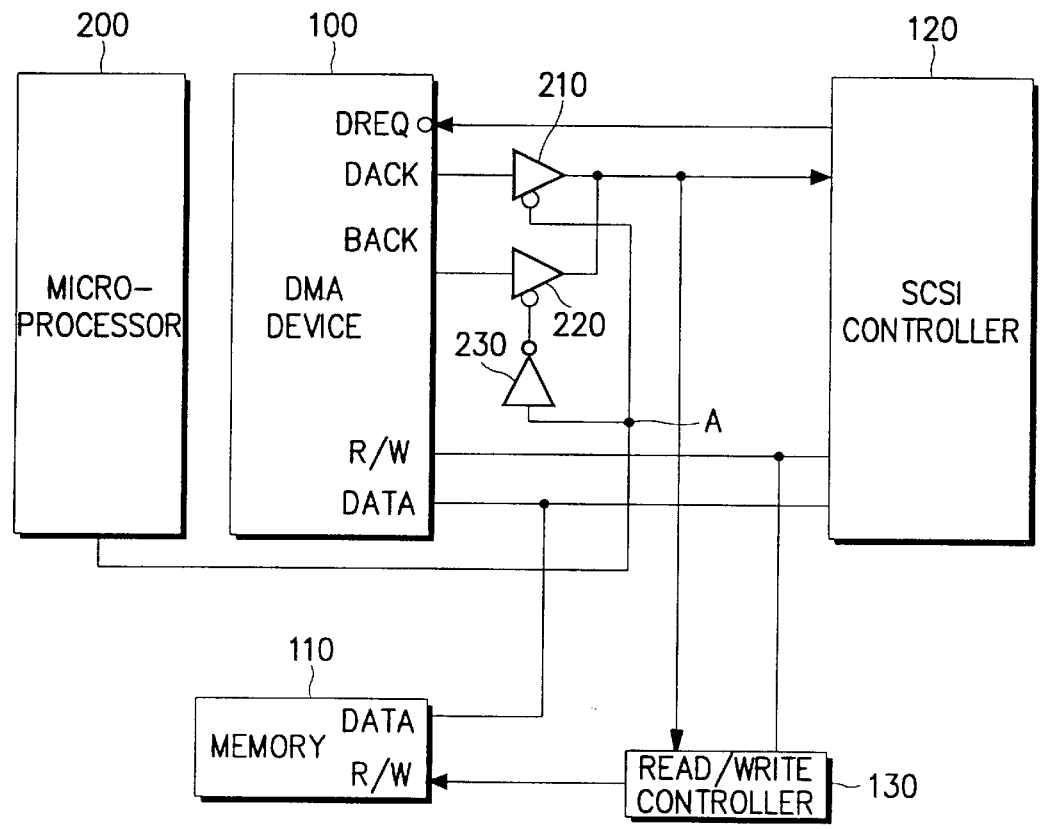
FIG. 2 is a block diagram of a DMA transmission system according to an embodiment of the present invention.

Referring to FIG. 2, a DMA transmission system according to the present invention includes a DMA device 100', a memory 110, an SCSI controller (or an AT HDD controller) 120, a read/write controller 130, and a microprocessor 200. As illustrated in FIG. 2, the DMA device 100' controls data transmission between the memory 110 and the SCSI controller 120 which is an input/output device. Upon receiving a DMA request signal DREQ generated by the SCSI controller 120, the DMA device 100' sends a single mode data acknowledgment signal DACK and a burst mode data acknowledgment signal BACK to the SCSI controller 120 and the read/write controller 130. The read/write controller 130 sends a single mode control signal to the memory 110 in response to the single mode data acknowledgment signal DACK so as to allow the memory 110 to operate in single mode. Alternatively, the read/write controller 130 sends a burst mode control signal to the memory 110 in response to the burst mode data acknowledgment signal BACK so as to allow the memory 110 to operate in burst mode. Further, a first buffer 210 transfers the single mode data acknowledgment signal DACK from the DMA device 100' to the SCSI controller 120 in response to a mode selection control signal generated by the microprocessor 200. A second buffer 220 transfers the burst mode data acknowledgment signal BACK from the DMA device 100' to the SCSI controller 120 in response to the mode selection control signal inverted by an inverter 230. The inverter 230 is interposed between an output of the microprocessor 200 and a control terminal of the second buffer 220.

In operation, when the DMA transmission system operates in the single mode, the microprocessor 200 generates a mode selection control signal having a "low" state. Then, the first buffer 210 transfers the single mode data acknowledgment signal DACK from the DMA device 100' to the SCSI controller 120 and the read/write controller 130 in response to the mode selection control signal of "low" state generated by the microprocessor 200. Inverter 230 inverts the mode selection control signal from "low" state to "high" state. Thus, the second buffer 220 is inactivated in response to the inverted mode selection control signal of "high" state, and blocks off the burst mode data acknowledgment signal BACK being transferred from the DMA device 100' to the SCSI controller 120 and the read/write controller 130.

When the DMA transmission system operates in burst mode, the microprocessor 200 generates a mode selection control signal of "high" state. The first buffer 210 is inactivated in response to the mode selection control signal of "high" state, and blocks off the single mode data acknowledgment signal DACK being transferred from the DMA device 100' to the SCSI controller 120 and the read/write controller 130. The inverter 230 inverts the mode selection control signal of "high" state to "low" state. The second buffer 220 transfers the burst mode data acknowledgment signal BACK from the DMA device 100' to the SCSI controller 120 and the read/write controller 130 in response to the inverted mode selection control signal of "low" state. Thus, the DMA transmission system operates in the burst mode.

As can be appreciated from the foregoing descriptions, the mode selection apparatus of the invention freely switches the DMA transmission system between the burst mode and the single mode by software control. Therefore, a DMA transmission system using the mode selection apparatus can handle both the burst mode and the single mode without additional hardware, thereby resulting in an increase in yield.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A timing mode selection apparatus for use in a direct memory access (DMA) transmission system which includes a DMA device and an input/output device directly accessible to a memory, said apparatus comprising:

timing mode selection means for generating a mode selection control signal for switching a timing mode; and transferring means for selectively transferring one of a burst mode data acknowledgment signal and a single mode data acknowledgment signal to said input/output device in response to, and in accordance with, said mode selection control signal.

2. A timing mode selection apparatus according to claim 1, wherein said timing mode selection means comprises:

a microprocessor for generating said mode selection control signal to switch the timing mode, said mode selection signal having one of a first logic state and a second logic state;

a first buffer connected between said DMA device and said input/output device for transferring the single mode data acknowledgment signal from said DMA device to said input/output device in response to said mode selection control signal having the first logic state; and a second buffer connected between said DMA device and said input/output device for transferring the burst mode data acknowledgment signal from said DMA device to said input/output device in response to said mode selection control signal having the second logic state.

3. A timing mode selection apparatus for use in a direct memory access (DMA) transmission system which includes a DMA device and an input/output device directly accessible to a memory said apparatus comprising:

timing mode selection means for generating a mode selection control signal for switching a timing mode; and transferring means for selectively transferring one of a burst mode data acknowledgment signal and a single mode data acknowledgment signal to said input/output device in response to, and in accordance with, said mode selection control signal;

wherein said timing mode selection means comprises:

a microprocessor for generating said mode selection control signal to switch the timing mode, said mode selection signal having one of a first logic state and a second logic state a first buffer connected between said DMA device and said input/output device for transferring the single mode data acknowledgment signal from said DMA device to said input/output device in response to said mode selection control signal having the first logic state; and a second buffer connected between said DMA device and said input/output device for transferring the burst mode data acknowledgment signal from said DMA device to said input/output device in response to said mode selection control signal having the second logic state;

said apparatus further comprising inverter means connected between said microprocessor and said second buffer for inverting the mode selection control signal output from said microprocessor, the inverted mode selection control signal being applied to a control tenninal of said second buffer.

4. A timing mode selection apparatus according to claim 1, wherein said transferring means comprises:

a first buffer connected between said DMA device and said input/output device for transferring the single mode data acknowledgment signal from said DMA device to said input/output device in response to said mode selection control signal having the first logic state; and a second buffer connected between said DMA device and said input/output device for transferring a burst mode data acknowledgment signal from said DMA device to said input/output device in response to said mode selection control signal having the second logic state.

5. A timing mode selection apparatus for use in a direct memory access (DMA) transmission system which includes a DMA device and an input/output device directly accessible to a memory said apparatus comprising:

timing mode selection means for generating a mode selection control signal for switching a timing mode; and transferring means for selectively transferring one of a burst mode data acknowledgment signal and a single mode data acknowledgment signal to said input/output device in response to, and in accordance with, said mode selection control signal;

wherein said transferring means comprises:

a first buffer connected between said DMA device and said input/output device for transferring the single mode data acknowledgment signal from said DMA device to said input/output device in response to said mode selection control signal having the first logic state; and a second buffer connected between said DMA device and said input/output device for transferring a burst mode data acknowledgment signal from said DMA device to said input/output device in response to said mode selection control signal having the second logic state;

said apparatus further comprising inverting means connected between said timing mode selection means and said second buffer for inverting the mode selection control signal output from said timing mode selection means, the inverted mode selection control signal being applied to a control tenninal of said second buffer.

6. A timing mode selection apparatus for use in a direct memory access (DMA) transmission system which includes a DMA device and an input/output device directly accessible to a memory, said apparatus comprising:

microprocessor means for generating a mode selection control signal for switching a timing mode, said mode selection control signal have one of a first logic state and a second logic state;

first buffer means connected between said DMA device and said input/output device for transferring a single mode data acknowledgment signal from said DMA device to said input/output device in response to the mode selection control signal having the first logic state;

second buffer means connected between said DMA device and said input/output device for transferring a burst mode data acknowledgment signal from said DMA device to said input/output device in response to the mode selection control signal having the second logic state; and inverter means connected between said microprocessor means and said second buffer means for inverting the mode selection control signal output from said microprocessor means, the inverted mode selection control signal being applied to a control terminal of said second buffer means.

7. A timing mode selection apparatus for use in a direct memory access (DMA) transmission system which includes a DMA device and an input/output device directly accessible to a memory, said apparatus comprising;

microprocessor means for generating a mode selection control signal for switching a timing mode;

transferring means for selectively transferring one of a burst mode data acknowledgment signal and a single mode data acknowledgment signal to said input/output device in response to, and in accordance with, said mode selection control signal; and inverter means connected between said microprocessor means and said transferring means for inverting the mode selection control signal from said microprocessor means so as to provide a non-inverted representation of the mode selection control signal and an inverted representation of the mode selection control signal to said transferring means;

wherein said transferring means utilizes said non-inverted representation and said inverted representation of said mode selection control signal to selectively transfer said burst mode data acknowledgment single and said single mode data acknowledgment single to said input/output device.

8. The apparatus as recited in claim 7, wherein said transferring means comprises a first buffer connected between said DMA device and said input/output device for transferring the single mode data acknowledgment signal from said DMA device to said input/output device in response to one of the non-inverted and inverted representations of the mode selection control signal, and a second buffer connected between said DMA device and said input/output device for transferring the burst mode data acknowledgment signal from said DMA device to said input/output device in response to another of the non-inverted and inverted representation of the mode selection control signal.

* * * * *